(12) United States Patent
Inabata et al.

(10) Patent No.: US 12,443,044 B2
(45) Date of Patent: Oct. 14, 2025

(54) PROJECTION SUBSTRATE AND SMART GLASSES

(71) Applicant: Cellid, Inc., Tokyo (JP)

(72) Inventors: Tatsuo Inabata, Tokyo (JP); Susumu Tateoka, Tokyo (JP); Toshiaki Shozu, Tokyo (JP); Satoshi Shiraga, Tokyo (JP)

(73) Assignee: Cellid, Inc., Tokyo (JP)

( * ) Notice: Subject to any disclaimer, the term of this patent is extended or adjusted under 35 U.S.C. 154(b) by 0 days.

(21) Appl. No.: 18/613,024

(22) Filed: Mar. 21, 2024

(65) Prior Publication Data

US 2024/0231110 A1 Jul. 11, 2024

Related U.S. Application Data

(63) Continuation of application No. PCT/JP2021/034799, filed on Sep. 22, 2021.

(51) Int. Cl.
*G02B 27/01* (2006.01)
*G02B 27/09* (2006.01)
*G02B 27/10* (2006.01)

(52) U.S. Cl.
CPC ..... *G02B 27/0172* (2013.01); *G02B 27/0955* (2013.01); *G02B 27/1086* (2013.01); *G02B 2027/0178* (2013.01)

(58) Field of Classification Search
CPC ............ G02B 27/0172; G02B 27/0955; G02B 27/1086; G02B 2027/0178
See application file for complete search history.

(56) References Cited

U.S. PATENT DOCUMENTS

| | | | |
|---|---|---|---|
| 7,747,113 | B2 | 6/2010 | Mukawa et al. |
| 2014/0204438 | A1* | 7/2014 | Yamada ................... G02B 5/18 |
| | | | 362/608 |
| 2018/0095201 | A1 | 4/2018 | Melli et al. |
| 2019/0250406 | A1* | 8/2019 | Nakamura ......... G02B 27/0172 |
| 2020/0057307 | A1 | 2/2020 | Yoshikaie |

(Continued)

FOREIGN PATENT DOCUMENTS

| | | |
|---|---|---|
| CN | 112987180 | 6/2021 |
| JP | 2014142386 | 8/2014 |
| JP | 2015049376 | 3/2015 |

(Continued)

*Primary Examiner* — Robert J Michaud
(74) *Attorney, Agent, or Firm* — JCIPRNET

(57) ABSTRACT

A projection substrate including: an incident region that includes a diffraction grating in which a plurality of first grooves are formed with a first period; a splitting region that includes a diffraction grating in which a plurality of second grooves are formed with a second period; and an emission region that includes a diffraction grating in which a plurality of third grooves are formed with a third period, wherein the incident region guides an incident projection light toward the splitting region, the splitting region includes a plurality of first divided regions, each having the second grooves with different depths, and guides a part of the projection light entering from the incident region toward the emission region, and the emission region guides at least a part of the projection light entering from the splitting region and emits that part of the projection light as an image light from a second surface.

16 Claims, 6 Drawing Sheets

(56) References Cited

U.S. PATENT DOCUMENTS

2021/0175216 A1  6/2021  Pendse
2022/0357579 A1  11/2022  Drazic et al.

FOREIGN PATENT DOCUMENTS

| JP | 2017146447 | 8/2017 |
| JP | 2017207686 | 11/2017 |
| JP | 2019531508 | 10/2019 |
| TW | 202122870 | 6/2021 |
| WO | 2018198587 | 11/2018 |
| WO | 2021053182 | 3/2021 |

* cited by examiner

PROJECTION SUBSTRATE AND SMART GLASSES

CROSS-REFERENCE TO RELATED APPLICATIONS

The present application is a continuation application of International Application number PCT/JP2021/034799, filed on Sep. 22, 2021. The contents of this application are incorporated herein by reference in their entirety.

BACKGROUND OF THE INVENTION

Conventionally, an eyeglass-type device, a head mounted display, and the like have been known for displaying two-dimensional images to be observed by a user, utilizing an optical system including a waveguide and the like (for example, refer to Japanese Unexamined Patent Publication No. 2017-207686).

Since such devices incorporate the optical system into limited space, the optical system may become complicated. In addition, if a simple optical system is used, luminance of the images projected in a display region may vary.

BRIEF SUMMARY OF THE INVENTION

The present disclosure focuses on these points, and its object is to reduce variation in luminance of a projection image to be observed by a user with a simple configuration.

A first aspect of the present disclosure provides a projection substrate for projecting an image light onto a second surface while transmitting at least a part of light that entered from a first surface to the second surface opposite to the first surface, the projection substrate including: an incident region that includes a diffraction grating in which a plurality of first grooves are formed with a first period; a splitting region that includes a diffraction grating in which a plurality of second grooves are formed in with second period; and an emission region that includes a diffraction grating in which a plurality of third grooves are formed with a third period; wherein a projection light for causing the image light to be projected may enter the incident region, and the incident region may guide the incident projection light toward the splitting region, the splitting region may include a plurality of first divided regions arranged in a traveling direction of the incident projection light, each having the second grooves with different depths, and guide a part of the projection light that entered from the incident region toward the emission region, and the emission region may guide at least a part of the projection light that entered from the splitting region and emit that part of the projection light as the image light from the second surface.

Smart glasses that are worn by a user, the smart glasses including: the projection substrate according to the first aspect, which is provided as at least one of a lens for the right eye or a lens for the left eye of the user, and projects the image light onto the second surface, while transmitting at least a part of light entering from the first surface through the eyes of the user; a frame that fixes the projection substrate; and a projection part that is provided in the frame and radiates the projection light for projecting the image light to the emission region onto the incident region of the projection substrate.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration Example of Smart Glasses 10

Figure 1:
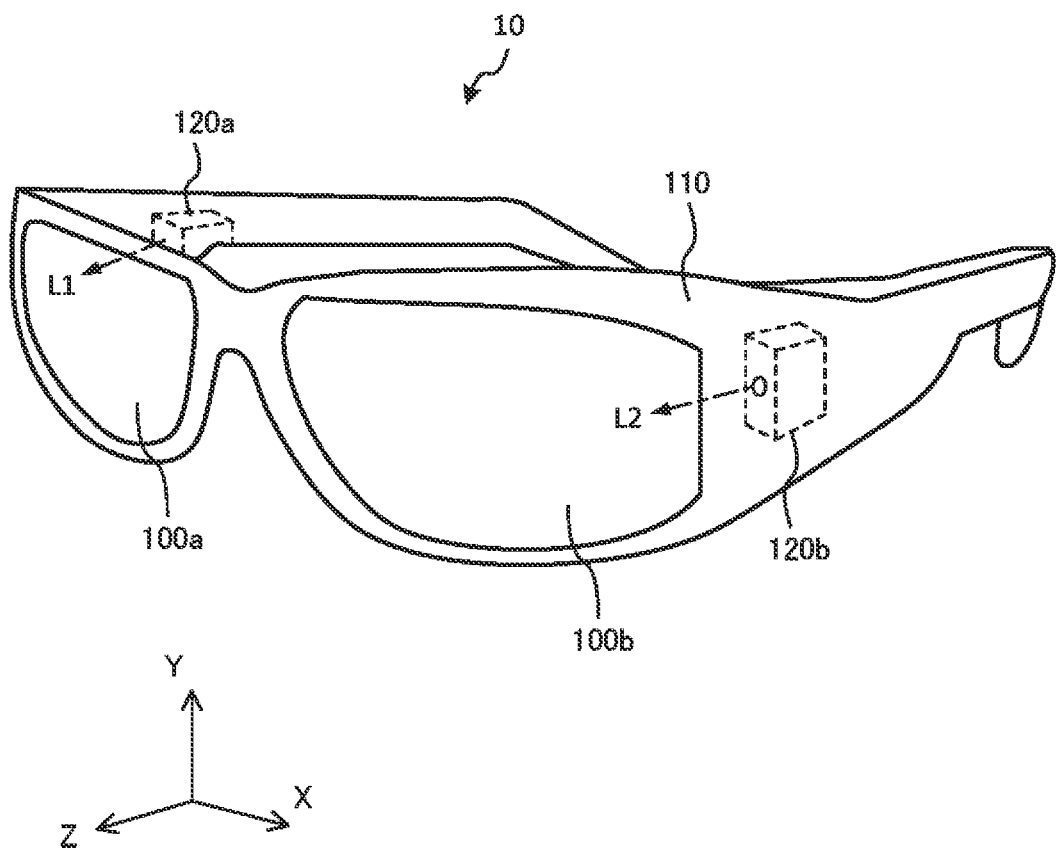
FIG. 1 shows a configuration example of smart glasses 10 according to the present embodiment.

FIG. 1 shows a configuration example of smart glasses 10 according to the present embodiment. In this embodiment, three mutually orthogonal axes are designated as the X-axis, Y-axis, and Z-axis. The smart glasses 10 are a wearable device worn by a user, for example. The smart glasses 10 project an image light onto a display region provided on a projection substrate 100 while having a user observe a view through glasses. The smart glasses 10 include the projection substrate 100, a frame 110, and a projection part 120.

The projection substrate 100 projects the image light onto a second surface while transmitting at least a part of the light entering from a first surface to the eyes of the user. Here, the first surface of the projection substrate 100 is a surface facing the side opposite to the user when the user is wearing the smart glasses 10. The second surface of the projection substrate 100 is a surface facing the user when the user is wearing the smart glasses 10. FIG. 1 shows an example in which the first surface and the second surface of the projection substrate 100 are disposed approximately parallel to an XY plane. The projection substrate 100 is a glass substrate on which a diffraction grating, functioning as a waveguide, is formed, for example. The projection substrate 100 will be described later.

The frame 110 fixes the projection substrate 100. The frame 110 is provided with the projection substrate 100 as at least one of a lens for the right eye or a lens for the left eye of the user. FIG. 1 shows an example in which a projection substrate 100a is provided as the lens for the right eye of the user on the frame 110, and a projection substrate 100b is provided as the lens for the left eye.

Alternatively, the frame 110 may be provided with one projection substrate 100 as the lens for the right eye or the lens for the left eye of the user. Further, the frame 110 may be provided with one projection substrate 100 as a lens for both eyes of the user. In this case, the frame 110 may have a goggle shape. The frame 110 has parts such as a temple, a strap, and the like so that the user can wear the smart glasses 10.

The projection part 120 is provided in the frame 110 and radiates the projection light, for causing the image light to be projected onto the projection substrate 100, toward the projection substrate 100. The frame 110 is provided with one or a plurality of such projection parts 120. FIG. 1 shows an example in which (i) a projection part 120a for irradiating a projection substrate 100a with a projection light L1 and (ii) a projection part 120b for irradiating a projection substrate 100b with a projection light L2 are provided in the frame 110.

The projection part 120 may be provided at a portion of the frame 110 to which the projection substrate 100 is fixed, or may be provided in the temple or the like of the frame 110. The projection part 120 is preferably provided integrally with the frame 110. For example, the projection part 120 radiates a projection light including one wavelength onto the projection substrate 100, allowing the user to observe a monochrome image. Further, the projection part 120 may radiate the projection substrate 100 with a projection light including a plurality of wavelengths, allowing the user to observe an image including multiple colors.

Figure 2:
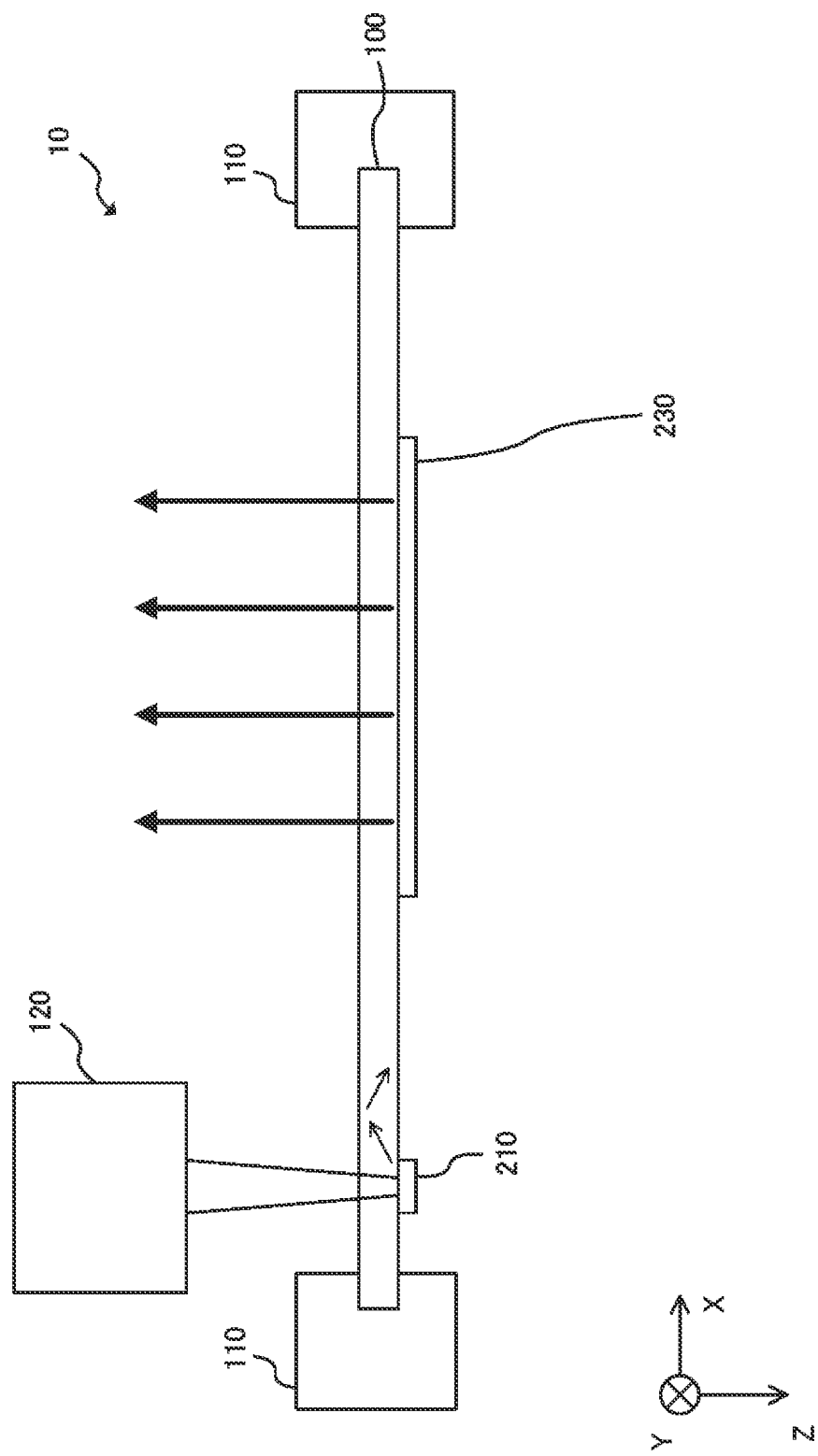
FIG. 2 shows an outline of an optical path of a projection light in the smart glasses 10 according to the present embodiment.

FIG. 2 shows an outline of an optical path of a projection light in the smart glasses 10 according to the present embodiment. The projection part 120 radiates the projection light onto an incident region 210 provided on the projection substrate 100. The incident region 210 guides the projection light into a substrate of the projection substrate 100. Then, the projection substrate 100 emits the projection light guided into the substrate as an image light from an emission region 230. The incident region 210 and the emission region 230 will be described later.

Figure 3:
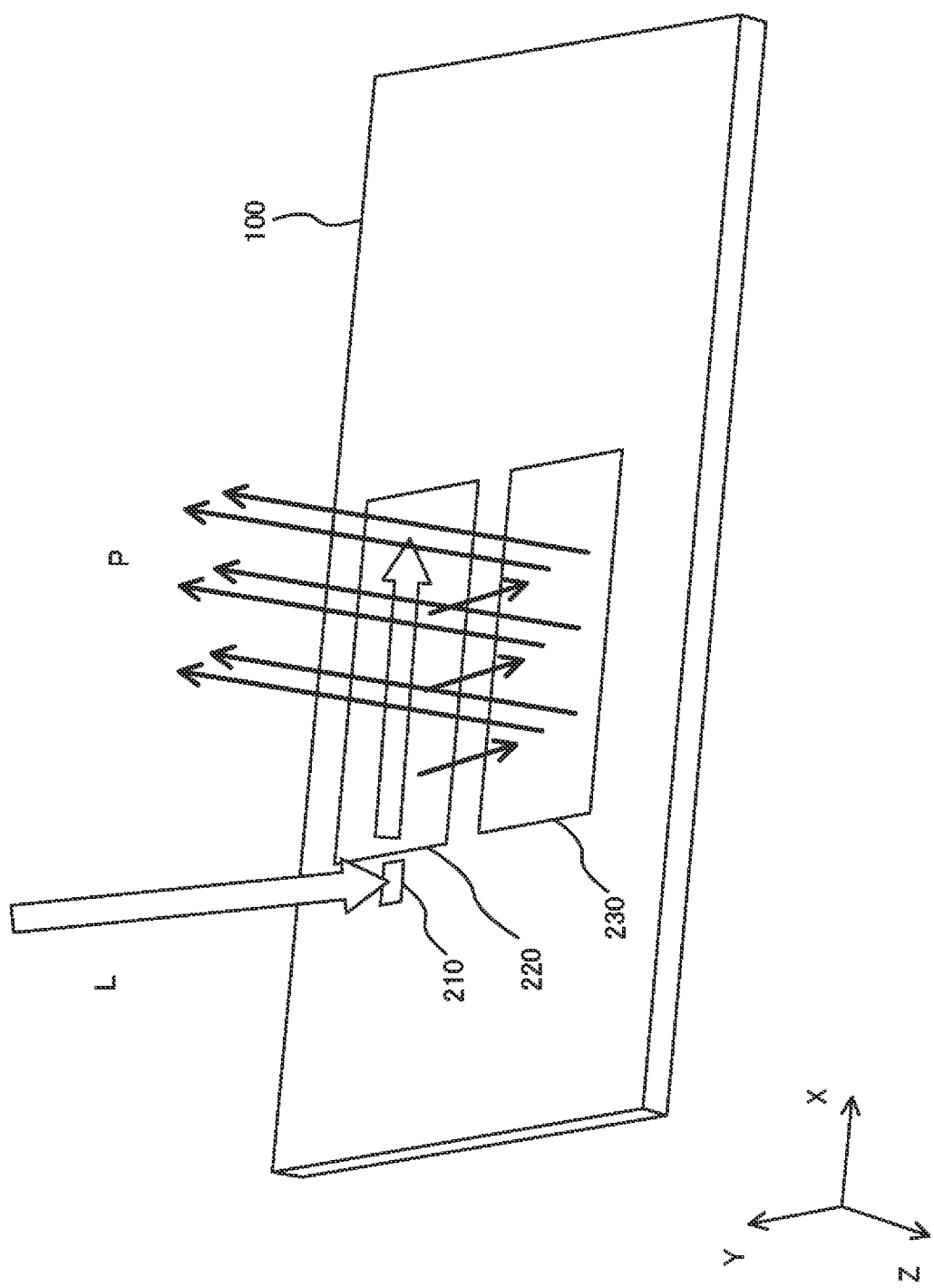
FIG. 3 shows an outline of the optical path of the projection light in a projection substrate 100 according to the present embodiment.

FIG. 3 shows an outline of an optical path of a projection light in the projection substrate 100 according to the present embodiment. As will be described later, the projection substrate 100 includes the incident region 210, a splitting region 220, and the emission region 230. A projection light L enters the incident region 210 and is emitted from the emission region 230 through the splitting region 220 as an image light P. The splitting region 220 guides the projection light L to the emission region 230, part by part, as the projection light L travels away from the incident region 210.

Similarly, as the projection light L travels away from the splitting region 220, the emission region 230 also emits portions of the projection light L as part of the image light P. By doing this, the projection substrate 100 emits, as the image light P, the projection light L incident on the incident region 210 from the emission region 230.

Here, an example is conceived of in which the splitting region 220 guides the projection light L to the emission region 230 at a constant rate throughout the entire region of the splitting region 220. In this case, since the quantity of the projection light L decreases as the projection light L travels away from the incident region 210, the intensity of the projection light L entering the emission region 230 from the splitting region 220 may differ depending on a distance from the incident region 210.

Similarly, an example is conceived of in which the emission region 230 emits, as the image light P, the projection light L at a constant rate throughout the entire region of the emission region 230. In this case, since the quantity of the projection light L decreases as the projection light L travels away from the splitting region 220, the intensity of the image light P emitted from the emission region 230 may differ depending on a distance from the incident region 210 and a distance from the emission region 230. For example, luminance may gradually decrease from the upper left pixels to the lower right pixels of an image projected by the emission region 230. The projection substrate 100 according to the present embodiment reduces such variations in the luminance.

Example of the Projection Light and Image Light

Figure 4:
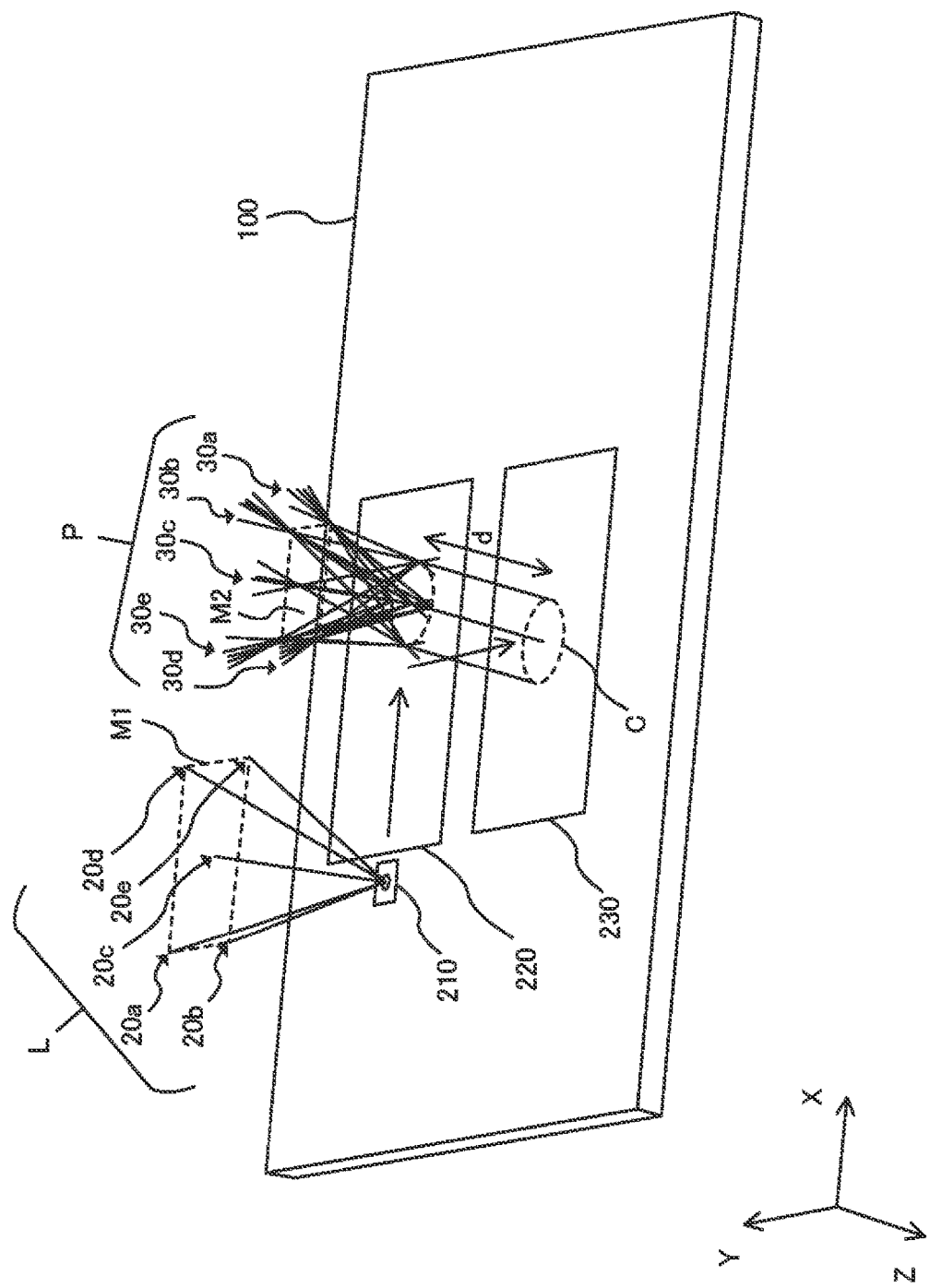
FIG. 4 shows an example of a projection light which is radiated from a projection part 120 according to the present embodiment to the projection substrate 100, and an image light emitted from the projection substrate 100.

FIG. 4 shows an example of the projection light L radiated from the projection part 120 to the projection substrate 100 and the image light P emitted from the projection substrate 100 according to the present embodiment. For example, the projection part 120 radiates the projection light L toward the second surface of the projection substrate 100 positioned in the Z direction. The projection light L corresponds to an image to be shown to the user, and for example, when a screen or the like is installed on a plane approximately parallel to the XY plane and the projection light L is projected thereon, an image M1 to be observed by the user is displayed on that screen. The image to be shown to the user is an AR (Augmented Reality) image or a VR (Virtual Reality) image generated by a processor included in the projection part 120, for example. In this way, the projection part 120 radiates, as the projection light L, a plurality of light rays forming the image M1 on the plane approximately parallel to the XY plane.

In this embodiment, an example in which the projection part 120 projects an approximately rectangular image M1, whose longitudinal direction is the X-axis direction on the plane, approximately parallel to the XY plane will be described. In FIG. 4, five light rays, from among the plurality of light rays radiated by the projection part 120, are shown as input light rays 20. For example, a light ray corresponding to the upper left pixels of the image is a first input light ray 20a, a light ray corresponding to the lower left pixels of the image is a second input light ray 20b, a light ray corresponding to the center pixels of the image is a third input light ray 20c, a light ray corresponding to the upper right pixels of the image is a fourth input light ray 20d, and a light ray corresponding to the lower right pixels of the image is a fifth input light ray 20e.

For example, the projection part 120 irradiates the incident region 210 of the projection substrate 100 with such projection light L so as to form an upright virtual image at infinity or at a predetermined position. The projection light incident on the incident region 210 passes through the splitting region 220 and is emitted from the emission region 230 as the image light P. The image light P is emitted from the emission region 230 and enters the user's eyes, which are at a distance d from the projection substrate 100. The image light P forms an image M2 on the retina of the user's eyes. In this way, the image light P includes a plurality of light fluxes that form the image M2.

In FIG. 4, five light fluxes, from among a plurality of light fluxes which are radiated from a circular region C of the emission region 230 of the projection substrate 100 and formed into an image at a predetermined position, are shown as output light fluxes 30. For example, a light flux formed into an image as the lower right pixels of the image M2 is designated as a first output light flux 30a, a light flux formed into an image as the upper right pixels of the image M2 is designated as a second output light flux 30b, a light flux formed into an image as the center pixels of the image M2 is designated as a third output light flux 30c, a light flux formed into an image as the lower left pixels of the image M2 is designated as a fourth output light flux 30d, and a light flux formed into an image as the upper left pixels of the image M2 is designated as a fifth output light flux 30e.

Each light flux corresponds to one of the plurality of input light rays 20 entering from the projection part 120. For example, the first output light flux 30a corresponds to the first input light ray 20a, and the first output light flux 30a includes a plurality of light rays generated by a plurality of splittings, diffractions, and the like of the first input light ray 20a that take place from the incident region 210 to the emission region 230 of the projection substrate 100. Similarly, the second output light flux 30b corresponds to the second input light ray 20b, the third output light flux 30c corresponds to the third input light ray 20c, the fourth output light flux 30d corresponds to the fourth input light ray 20d, and the fifth output light flux 30e corresponds to the fifth input light ray 20e.

In other words, the image M2, which is the image light P emitted from the emission region 230 and formed on the retina of the user's eyes, corresponds to the image M1 projected with the projection light L radiated by the projection part 120. In this way, the user wearing the smart glasses 10 can perceive the image M2 as if it were projected onto the second surface of the projection substrate 100, superimposed on a view seen through the projection substrate 100. In other words, the emission region 230 functions as the display region for displaying the image M2 corresponding to the image M1 projected with the projection light L.

In FIG. 4, the image M2 observed by the user is an image obtained by inverting the image M1 projected with the projection light L vertically and horizontally. The image M1 projected with the projection light L may be a still image, or instead, may be a moving image. The projection substrate 100 that emits the image light P corresponding to the incident projection light L will now be described.

Configuration Example of the Projection Substrate 100

Figure 5:
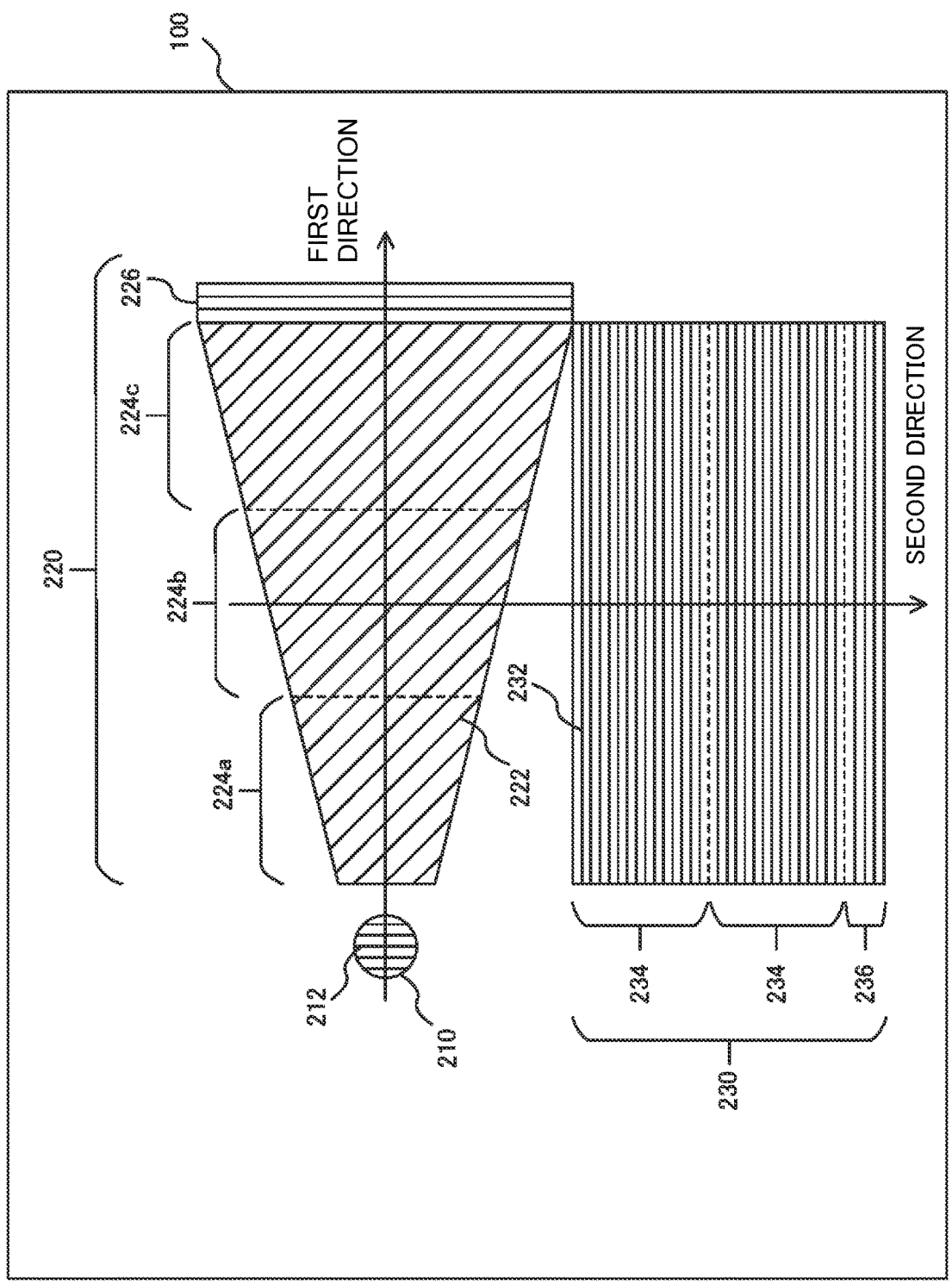
FIG. 5 shows a configuration example of the projection substrate 100 according to the present embodiment.

FIG. 5 shows a configuration example of the projection substrate 100 according to the present embodiment. FIG. 5 shows an example in which the first surface and the second surface of the projection substrate 100 are disposed approximately parallel to the XY plane. The projection substrate 100 is a substrate for projecting the image light onto the second surface, which is the opposite side of the first surface, while transmitting at least a part of the light that entered from the first surface to the second surface. The projection substrate 100 is a glass substrate, for example. The projection substrate 100 includes the incident region 210, the splitting region 220, and the emission region 230.

Example of the Incident Region 210

A projection light for projecting an image light enters the incident region 210, and the incident region 210 guides the incident projection light toward the splitting region 220. FIG. 5 shows an example in which the incident region 210 has a circular shape in a plane approximately parallel to the XY plane, but the present disclosure is not limited thereto. The incident region 210 may have a shape such as an ellipse, a polygon, or a trapezoid, as long as it can guide the projection light to the splitting region 220.

The incident region 210 includes a diffraction grating in which a plurality of first grooves 212 are formed with a first period. In other words, the plurality of first grooves 212 are arranged on the upper surface of the projection substrate 100 in the same direction with a predetermined groove width and interval, thereby functioning as the diffraction grating. The incident region 210 has a reflective or transmissive diffraction grating and guides the projection light in a direction of the splitting region 220 through reflective or transmissive diffraction.

The first period of the plurality of first grooves 212 is in a range of about 10 nm to about 10 µm, for example. The first period is preferably in a range of about 100 nm to about 1 µm. The first period is more preferably in a range of about 200 nm to about 800 nm. The depth of the plurality of first grooves 212 is in a range of about 1 nm to about 10 µm. The depth of the plurality of first grooves 212 is preferably in a range of about 50 nm to about 800 nm.

The fill factor of the plurality of first grooves 212 is in a range of about 0.1 to about 0.9. The fill factor of the plurality of first grooves 212 is preferably in a range of about 0.3 to about 0.7. Here, the fill factor is a value obtained by dividing a distance between two adjacent first grooves 212 by the first period. The distance between two adjacent first grooves 212 may be referred to as a "line", the width of the first groove 212 may be referred to as a "space", and the first period may be referred to as a "pitch". In this case, the pitch is the sum of the line and the space, and the fill factor is a value obtained by dividing the line by the pitch.

The plurality of first grooves 212 are arranged in a direction from the incident region 210 toward the splitting region 220, for example. Here, the traveling direction of the projection light from the incident region 210 toward the splitting region 220 is referred to as a first direction. FIG. 5 shows an example in which the first direction is a direction approximately parallel to the X-axis direction, and the first grooves 212 extending in a direction approximately parallel to the Y-axis direction are arranged in the first direction. Since the projection light converges as it enters the incident region 210, the incident region 210 guides the projection light to the splitting region 220 such that the projection light spreads out at a divergence angle centered on the first direction within the plane of the projection substrate 100.

Example of the Splitting Region 220

The splitting region 220 guides a part of the projection light that entered from the incident region 210 toward the emission region 230. The splitting region 220 is provided in a region through which the projection light passes, in the plane approximately parallel to the XY plane. The splitting region 220 has a reflective diffraction grating, and guides the projection light toward the emission region 230 through the reflective diffraction. The splitting region 220 has a rectangular shape whose longitudinal direction is the first direction, for example.

Since the projection light travels while spreading out around the first direction, it is preferable for the splitting region 220 to have a shape that widens as the distance from the incident region 210 increases, diverging from the first direction, which is a traveling direction of the projection light passing through the incident region 210. The splitting region 220 has a trapezoidal shape, a fan shape, or the like in the plane approximately parallel to the XY plane, for example. FIG. 5 shows an example in which the splitting region 220 has the trapezoidal shape. A splitting region 220 with such a shape can be formed to correspond to a region where the projection light spreads while travelling in the XY plane, and can efficiently guide the projection light.

The splitting region 220 includes a diffraction grating in which a plurality of second grooves 222 are formed with a second period. In other words, the plurality of second grooves 222 are arranged on the upper surface of the projection substrate 100 in the same direction with a predetermined groove width and interval, thereby functioning as the diffraction grating. The splitting region 220 functions as, for example, a reflective diffraction grating, and guides the projection light to the emission region 230.

The second period of the plurality of second grooves 222 is different from the first period of the plurality of first grooves 212. As the second period, it is desirable to select an appropriate period for guiding the projection light to the emission region 230. The second period is, for example, in a range of about 10 nm to about 10 µm. The second period is preferably in a range of about 50 nm to about 1 µm. The second period is more preferably in a range of about 100 nm to about 700 nm. The depth of the plurality of second grooves 222 is in a range of about 1 nm to about 10 µm. The depth of the plurality of second grooves 222 is preferably in a range of about 5 nm to about 800 nm. The fill factor of the plurality of second grooves 222 is in a range of about 0.1 to about 0.9. The fill factor of the plurality of second grooves 222 is preferably in a range of about 0.2 to about 0.85.

The plurality of second grooves 222 are arranged in a predetermined direction, for example. For example, a direction from the splitting region 220 toward the emission region 230 is defined as a second direction, and an angle formed between the first direction and the second direction is defined as a first angle. In this case, the plurality of second grooves 222 are formed in a direction inclined toward the second direction by an angle of ½ of the first angle with respect to the first direction. FIG. 5 shows an example in which the second direction is a direction approximately parallel to the Y-axis direction, the first angle is approximately 90 degrees, and the plurality of second grooves 222 are arranged in the direction inclined toward the second direction by approximately 45 degrees with respect to the first direction.

The splitting region 220 includes a plurality of first divided regions 224 arranged in the traveling direction of the incident projection light. The second grooves 222 formed in the plurality of first divided regions 224 have different depths. In other words, in the splitting region 220, the second grooves 222 are formed such that a ratio of light guided to the emission region 230 within the incident projection light varies for each of the first divided regions 224.

The splitting region 220 preferably includes three or more first divided regions 224. In this way, the splitting region 220 is divided into the plurality of first divided regions 224, thereby varying the quantity of projection light guided to the emission region 230 for each of the first divided regions 224. By doing this, the distribution of the quantity of light in a direction perpendicular to the traveling direction of the projection light is adjusted to be approximately constant, while guiding the projection light with different intensities, depending on the distance from the incident region 210, to the emission region 230.

For example, the second grooves 222 are formed in such a way that the depth of the second groove 222 provided in one of the first divided regions 224 is greater than the depth of the second groove 222 provided in the first divided region 224, which is closer to the incident region 210 than that particular divided region 224. In this case, the rate of change of depth of the second grooves 222 of two adjacent first divided regions 224 among the plurality of first divided regions 224 may increase as the distance from the incident region 210 increases.

As an example, a splitting region 220 having three first divided regions 224, as shown in FIG. 5, is considered. Here, it is assumed that a second groove 222a is formed with a depth such that the second groove 222a guides light with approximately ¼ of the quantity of the projection light incident on a first divided region 224a to the emission region 230 in the first divided region 224a, which is closest to the incident region 210 among the three first divided regions 224. In this case, approximately ¾ of the remaining quantity of the projection light incident on the first divided region 224a, which is closest to the incident region 210, enters an adjacent first divided region 224b.

It is assumed that a second groove 222b is formed with a depth such that the second groove 222b guides light with approximately ⅓ of the quantity of the projection light incident on the first divided region 224b to the emission region 230 in the first divided region 224b, which is second closest to the first divided region 224. In other words, the depth of the second groove 222b of the first divided region 224b, which is second closest to the incident region 210, is greater than the depth of the second groove 222a, so as to guide light having 4/3 times the quantity of light compared to the first divided region 224a, which is closest to the incident region 210, to the emission region 230. The first divided region 224b guides light with approximately ¼ of the quantity of the projection light incident on the first divided region 224a, which is closest to the incident region 210, to the emission region 230.

Then, approximately ½ of the remaining quantity of the projection light incident on the first divided region 224a, which is closest to the incident region 210, enters an adjacent first divided region 224c.

It is assumed that a second groove 222c is formed with a depth such that the second groove 222c guides light with approximately ½ of the quantity of the projection light incident on the first divided region 224c to the emission region 230 in the first divided region 224c, which is third closest to the incident region 210. In other words, the depth of the second groove 222c of the first divided region 224c, which is third closest to the incident region 210, is greater than the depth of the second groove 222b, so as to guide light having 3/2 times the quantity of light compared to the first divided region 224b, which is closest to the incident region 210, to the emission region 230.

In addition, the second grooves 222 of the two adjacent first divided regions 224 among the three first divided regions 224 are formed in such a way that the rate of change of depth of these second grooves 222 increases as the distance from the incident region 210 increases. Then, the first divided region 224c, which is third closest to the incident region 210, guides light with approximately ¼ of the quantity of the projection light incident on the first divided region 224a, which is closest to the incident region 210, to the emission region 230. As in the above example, it can be understood that by adjusting the quantity of the projection light to be guided to the corresponding emission region 230 for each of the first divided regions 224 to a predetermined value, the splitting region 220 can guide the projection light to the emission region 230 while ensuring approximately constant distribution of the quantity of the projection light guided to the respective emission regions 230.

The splitting region 220 may further include a first reflection region 226 at a position furthest from the incident region 210. FIG. 5 shows an example in which the splitting region 220 includes three first divided regions 224 and the first reflection region 226. The first reflection region 226 reflects at least a part of the light that has passed through the plurality of first divided regions 224 to the plurality of first divided regions 224 again. The first reflection region 226 includes second grooves 222 of greater depth than the depth of the second grooves 222 of the adjacent first divided region 224.

For example, it is desirable that the depth of the second grooves 222 of the first reflection region 226 is about three times or more the depth of the second grooves 222 having the largest depth among the second grooves 222 of the plurality of first divided regions 224. It is more desirable that the depth of the second grooves 222 of the first reflection region 226 is about ten times or more the depth of the second grooves 222 having the greatest depth of the second grooves 222 among the second grooves 222 of the plurality of first divided regions 224. The second grooves 222 of the first reflection region 226 may be arranged in the first direction.

Since the splitting region 220 includes such a first reflection region 226, the plurality of first divided regions 224 guide at least a part of the light reflected by the first reflection region 226 to the emission region 230. In this way, the splitting region 220 can guide more projection light to the emission region 230. The depth of the second grooves 222 of the plurality of first divided regions 224 may be determined such that the quantity of projection light guided to the emission region 230 from each of the first divided regions 224, incorporating the reflected light from the first reflection region 226, is approximately constant.

Example of the Emission Region 230

The emission region 230 guides at least a part of the projection light that entered from the splitting region 220 and emits that part of the projection light as an image light from the second surface of the projection substrate 100. FIG. 5 shows an example in which the emission region 230 has a rectangular shape whose longitudinal direction is the X-axis direction in a plane approximately parallel to the XY plane, but the present disclosure is not limited thereto. The emission region 230 may have a rectangular shape, a square shape, a trapezoid shape, or the like whose longitudinal direction is the Y-axis direction, as long as the emission region 240 can guide the projection light and emit it as the image light.

The emission region 230 has a diffraction grating in which a plurality of third grooves 232 are formed with a third period. In other words, the plurality of third grooves 232 are arranged on the upper surface of the projection substrate 100 in the same direction with a predetermined groove width and interval, thereby functioning as the diffraction grating. The emission region 230 has a reflective or transmissive diffraction grating and guides the image light toward the user's eye through reflective or transmissive diffraction.

The third period of the plurality of third grooves 232 provided in the emission region 230 is different from the second period of the plurality of second grooves 222 in the splitting region 220. The third period of the plurality of third grooves 232 in the emission region 230 may be the same as the first period of the plurality of first grooves 212 in the incident region 210. By making the period of the diffraction grating provided in the region into which the projection light enters and the period of the diffraction grating provided in the region where the image light is emitted coincide with each other in this manner, it is possible to reduce distortion or the like occurring in an image observed by the user.

The third period is in a range of about 10 nm to about 10 μm, for example. The third period is preferably in a range of about 100 nm to 1 μm. The third period is more preferably in a range of about 200 nm to 800 nm. The depth of the plurality of third grooves 232 is in a range of about 1 nm to 10 μm. The depth of the plurality of third grooves 232 is preferably in a range of about 5 nm to 800 nm. The fill factor of the plurality of third grooves 232 is in a range of about 0.1 to 0.9. The fill factor of the plurality of third grooves 232 is preferably in a range of about 0.2 to 0.85.

The plurality of third grooves 232 are arranged in the second direction, which is the direction from the splitting region 220 toward the emission region 230, for example. FIG. 5 shows an example in which the third grooves 232 extending in the first direction are arranged in the second direction.

Similarly to the splitting region 220, the emission region 230 includes a plurality of second divided regions 234 arranged in the traveling direction of the projection light that entered from the splitting region 220. The third grooves 232 formed in the plurality of second divided regions 234 have different depths. In other words, in the emission region 230, the third grooves 232 are formed such that a ratio of light which will be emitted as the image light within the incident projection light varies for each of the second divided regions 234.

The emission region 230 preferably includes two or more second divided regions 234. For example, the third groove 232 provided in one of the second divided regions 234 is assumed to have a depth greater than the depth of the third groove 232 provided in the second divided region 234, which is closer to the splitting region 220 than that particular second divided region 234. Further, when the emission region 230 includes three or more second divided regions 234, the rate of change of depth of the third grooves 232 of two adjacent second divided regions 234 may increase as the distance from the splitting region 220 increases.

As described above, the emission region 230 is divided into the plurality of second divided regions 234, resulting in variations in the quantity of light emitted as image light for each of the second divided regions 234. In this way, similarly to the plurality of first divided regions 224 of the splitting region 220, by guiding the projection light as the image light, the emission region 230 can adjust the distribution of the quantity of light across the entire image to be approximately constant when observed by an observer as an image.

The emission region 230 may further include a second reflection region 236 at a position furthest from the splitting region 220. FIG. 5 shows an example in which the emission region 230 includes two second divided regions 234 and the second reflection region 236. The second reflection region 236 reflects at least a part of the light that has passed through the plurality of second divided regions 234, to the plurality of second divided regions 234 again. The second reflection region 236 includes third grooves 232 of greater depth than the third grooves 232 of the adjacent second divided region 234.

For example, it is desirable that the depth of the third groove 232 of the second reflection region 236 is about three times or more the depth of the third grooves 232 having the largest depth among the third grooves 232 of the plurality of second divided regions 234. It is more desirable that the depth of the third grooves 232 of the second reflection region 236 is about ten times or more the depth of the third grooves 232 having the largest depth among the third grooves 232 of the plurality of second divided regions 234.

Since the emission region 230 includes such a second reflection region 236, the plurality of second divided regions 234 emit, as the image light, at least a part of the light reflected by the second reflection region 236 from the second surface of the projection substrate 100. In this way, the emission region 230 can emit more projection light as the image light, similarly to the splitting region 220. The depth of the third grooves 232 of the plurality of second divided regions 234 may be determined such that the quantity of light emitted as the image light from each of the second divided regions 234, incorporating the reflected light from the second reflection region 236, is approximately constant.

As described above, the projection substrate 100 according to the present embodiment splits the projection light entering the incident region 210 at different ratios for each of the plurality of first divided regions 224 of the splitting region 220, and emits them as image lights from the emission region 230. By doing this, the projection substrate 100 can reduce variation in the luminance of the projection image to be observed by the user. In addition, the projection substrate 100 can further reduce variation in the luminance of the image by emitting the image light at different ratios for each of the plurality of second divided regions 234 in the emitting region 230.

Such a projection substrate 100 can be realized by forming the diffraction grating corresponding to the incident region 210, the diffraction grating corresponding the splitting region 220, and the diffraction grating corresponding the emission region 230 on the first surface or the second surface of the glass substrate or the like. The grooves forming the diffraction grating are made of resist, resin, or the like, for example. Therefore, the projection substrate 100 according to the present embodiment is a substrate that can be easily produced by forming grooves with predetermined intervals and depths for each region, without incorporating complicated optical systems.

Variation Example of the Smart Glasses 10

Examples of the smart glasses 10, wherein the projection substrate 100 is provided in the frame 110, and the projection part 120 irradiates the incident region 210 of the projection substrate 100 with the projection light have been described above, but the present disclosure is not limited thereto. For example, a plurality of projection substrates 100 may be fixed to the frame 110 of the smart glasses 10. Such smart glasses 10 will now be described.

Figure 6:
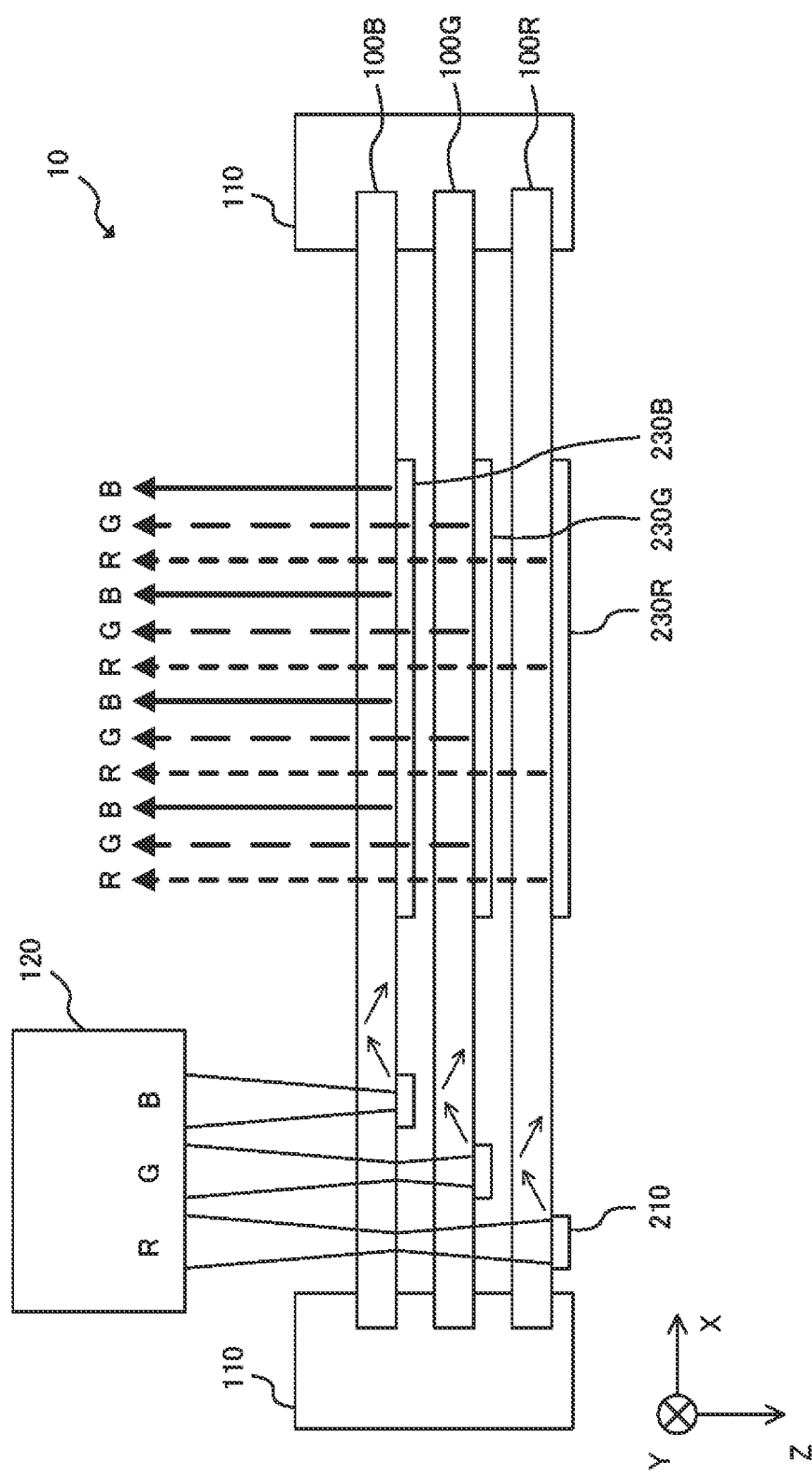
FIG. 6 shows a variation example of the smart glasses 10 according to the present embodiment.

FIG. 6 shows a variation example of the smart glasses 10 according to the present embodiment. In the smart glasses 10 of the variation example, components that are approximately the same as those of the smart glasses 10 according to the present embodiment shown in FIG. 1 are denoted by the same reference numerals, and description thereof is omitted. The appearance of the smart glasses 10 of the variation example may be approximately the same as that of the smart glasses 10 shown in FIG. 1.

A plurality of projection substrates 100 are fixed to the frame 110 of the smart glasses 10 of the variation example. In this configuration, the plurality of projection substrates 100 are fixed to the frame 110 in such a way that emission regions 230, provided on each of the plurality of projection substrates 100, overlap at least partially in a planar view that is approximately parallel to the XY plane. FIG. 6 shows an example in which projection substrates 100R, 100G, and 100B are fixed to the frame 110 of the smart glasses 10, and emission regions 230R, 230G, and 230B of the three projection substrates 100 overlap each other in the planar view in the XY plane.

The projection part 120 radiates projection lights of different wavelengths onto the corresponding incident regions 210 provided on each of the plurality of projection substrates 100, respectively. By doing this, the emission regions 230 provided on each of the plurality of projection substrates 100 respectively emit image light, corresponding to the projection lights respectively radiated onto the plurality of incident regions 210 from the projection part 120, from the second surface of the plurality of projection substrates 100 to the user's eyes.

Since the user wearing such smart glasses 10 observes an image in which the image lights of different wavelengths are superimposed, he/she can observe an image with colors resulting from color mixture. FIG. 6 shows an example in which the projection part 120 radiates three projection lights corresponding to the three primary colors of RGB (such as red, green, and blue), which form an image, to the incident regions 210 of the three projection substrates 100, respectively. Then, the three projection substrates 100 superimpose three image lights corresponding to the three primary colors of RGB and emit the superimposed lights to the user's eyes. By doing this, the user can observe an image having a plurality of colors of 2, for example. Here, n is a positive integer such as 4, 8, 16, or 24.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A projection substrate for projecting an image light onto a second surface while transmitting at least a part of light that entered from a first surface to the second surface opposite to the first surface, the projection substrate comprising:
   an incident region that includes a diffraction grating in which a plurality of first grooves are formed with a first period;
   a splitting region that includes a diffraction grating in which a plurality of second grooves are formed with a second period; and
   an emission region that includes a diffraction grating in which a plurality of third grooves are formed with a third period; wherein
   a projection light for causing the image light to be projected enters the incident region, and the incident region guides the incident projection light toward the splitting region,
   the splitting region includes a plurality of first divided regions arranged in a traveling direction of the incident projection light, each having the second grooves with different depths, and the splitting region includes a first reflection region that reflects at least a part of light that has passed through the plurality of first divided regions to the plurality of first divided regions again,
   the first reflection region is provided adjacent to the first divided region at a position furthest from the incident region on the same plane as the first divided region, and the first reflection region reflects light incident from the adjacent first divided region toward the adjacent first divided region, and
   wherein the plurality of first divided regions guides a part of the projection light that entered from the incident region toward the emission region, and guides at least a part of the light reflected by the first reflection region to the emission region, and the emission region guides at least a part of the projection light that entered from the splitting region and emits that part of the projection light as the image light from the second surface.

2. The projection substrate according to claim 1, wherein the splitting region includes three or more of the first divided regions, and a depth of the second grooves provided in one of the first divided regions is greater than a depth of the second grooves provided in the first divided region, which is closer to the incident region than the one of the first divided regions.

3. The projection substrate according to claim 2, wherein a rate of change of depth of the second grooves of two adjacent first divided regions among the plurality of first divided regions increases as a distance from the incident region increases.

4. The projection substrate according to claim 1, wherein the first reflection region includes the second grooves of greater depth than a depth of the second grooves of the adjacent first divided region.

5. The projection substrate according to claim 4, wherein the depth of the second grooves of the first reflection region is three times or more the depth of the second groove having the largest depth among the second grooves of the plurality of first divided regions.

6. The projection substrate according to claim 1, wherein the incident region guides the projection light to the splitting region such that the projection light spreads out at a divergence angle centered on a first direction in a plane of the projection substrate, and the splitting region has a shape that widens as a distance from the incident region increases, diverging from the first direction, which is a traveling direction of the projection light passing through the incident region.

7. The projection substrate according to claim 1, wherein the third period of the plurality of third grooves provided in the emission region is different from the second period of the plurality of second grooves in the splitting region.

8. The projection substrate according to claim 7, wherein the emission region includes a plurality of second divided regions arranged in a traveling direction of the projection light that entered from the splitting region, and each having the third grooves with different depths.

9. The projection substrate according to claim 8, wherein the emission region includes two or more of the second divided regions, and the third grooves provided in one of the second divided regions have a depth greater than the depth of the third grooves provided in the second divided region, which is closer to the splitting region than the one of the second divided region.

10. The projection substrate according to claim 8, wherein the emission region includes a second reflection region that reflects at least a part of light that has passed through the plurality of second divided regions to the plurality of second divided regions again, and the plurality of second divided regions emit, as the image light, at least a part of the light reflected by the second reflection region from the second surface.

11. The projection substrate according to claim 10, wherein the second reflection region is provided adjacent to the second divided region at a position furthest from the incident region among the plurality of second divided regions, and includes the third grooves of greater depth than the third grooves of the adjacent second divided region.

12. The projection substrate according to claim 11, wherein the depth of the third grooves of the second reflection region is three times or more the depth of the third grooves having the largest depth among the third grooves of the plurality of second divided regions.

13. The projection substrate according to claim 1, wherein the first period of the plurality of first grooves in the incident region is the same as the third period of the plurality of third grooves in the emission region.

14. Smart glasses that are worn by a user, the smart glasses comprising:

the projection substrate according to claim 1, which is provided as at least one of a lens for the right eye or a lens for the left eye of the user, and projects the image light onto the second surface, while transmitting at least a part of light entering from the first surface through the eyes of the user;

a frame that fixes the projection substrate; and a projection part that is provided in the frame and radiates the projection light, for projecting the image light to the emission region, onto the incident region of the projection substrate.

15. The smart glasses according to claim 14, wherein a plurality of the projection substrates are fixed to the frame, the projection part radiates the projection lights of different wavelengths onto the corresponding incident region provided on each of the plurality of projection substrates, respectively, and the emission regions, provided on each of the plurality of projection substrates, overlap at least partially in a planar view, and respectively emit the image lights, corresponding to the projection lights respectively radiated from the projection part onto the plurality of incidence regions, from the second surface of the plurality of projection substrates to the eyes of the user.

16. A projection substrate for projecting an image light onto a second surface while transmitting at least a part of light that entered from a first surface to the second surface opposite to the first surface, the projection substrate comprising:

an incident region that includes a diffraction grating in which a plurality of first grooves are formed with a first period;

a splitting region that includes a diffraction grating in which a plurality of second grooves are formed with a second period; and an emission region that includes a diffraction grating in which a plurality of third grooves are formed with a third period; wherein the first period and the second period are different periods, the first period and the third period are the same periods, a projection light for causing the image light to be projected enters the incident region, and the incident region guides the incident projection light toward the splitting region, the splitting region includes a plurality of first divided regions arranged in a traveling direction of the incident projection light, each having the second grooves with different depths, and guides a part of the projection light that entered from the incident region toward the emission region, and the emission region guides at least a part of the projection light that entered from the splitting region and emits that part of the projection light as the image light from the second surface.

* * * * *